(12) United States Patent
Hathorn et al.

(10) Patent No.: US 9,385,967 B1
(45) Date of Patent: Jul. 5, 2016

(54) RESOURCE ALLOCATION FOR A STORAGE AREA NETWORK

(71) Applicant: INTERNATIONAL BUSINESS MACHINES CORPORATION, Armonk, NY (US)

(72) Inventors: Roger G. Hathorn, Tucson, AZ (US); Dale F. Riedy, Poughkeepsie, NY (US); Harry M. Yudenfriend, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/959,812

(22) Filed: Dec. 4, 2015

(51) Int. Cl.
*G06F 15/173* (2006.01)
*H04L 12/911* (2013.01)
*H04L 29/08* (2006.01)
*H04L 12/26* (2006.01)

(52) U.S. Cl.
CPC .......... *H04L 47/826* (2013.01); *H04L 43/0858* (2013.01); *H04L 67/1097* (2013.01)

(58) Field of Classification Search
USPC .................. 709/217, 223, 224, 225, 226, 229
See application file for complete search history.

(56) References Cited

U.S. PATENT DOCUMENTS

| | | | |
|---|---|---|---|
| 4,550,747 A * | 11/1985 | Woodworth | G05D 7/0635 137/487.5 |
| 5,124,943 A * | 6/1992 | Lubarsky | H04L 12/52 709/221 |
| 7,213,087 B1 | 5/2007 | Bertone et al. | |
| 8,677,190 B2 | 3/2014 | Gardner | |
| 8,767,561 B2 | 7/2014 | Gnanasekaran et al. | |
| 2003/0112022 A1* | 6/2003 | Peck | G01N 27/225 324/689 |
| 2007/0260728 A1* | 11/2007 | Noble | H04L 41/142 709/224 |
| 2012/0014253 A1 | 1/2012 | Rongong et al. | |
| 2013/0329664 A1* | 12/2013 | Kim | H04W 24/10 370/329 |

OTHER PUBLICATIONS

IBM Corporation, "Method for Optimizing Buffer-to-BUffer Credit in a SAN", Nov. 17, 2006, IP.com, IP.com Prior Art Database Technical Disclosure, IP.com No. 000143263, pp. 2.

D.R. Riedy, "Improving z/OS I/O Resiliency", IBM Corporation, SHAREorg, Aug. 2, 2012, Session 11709, pp. 43.

B. Dufrasne, et al., "IBM DS8870 and IBM z Systems Synergy", IBM Corporation, Redbooks, document No. REDP-5186-00, Chapter 5.11.3, Jul. 2015, pp. 110.

* cited by examiner

*Primary Examiner* — Liangche A Wang
(74) *Attorney, Agent, or Firm* — William K. Konrad; Konrad Raynes Davda & Victor LLP

(57) ABSTRACT

Provided are a computer program product, system, and method for resource allocation in accordance with one embodiment of the present description, in which a resource allocation such as a buffer credit allocation for a port in a storage area network is initialized as a function of a measurement of a length of a communication link for the port of the storage area network. In one embodiment, the length measurement is a function of a minimum command response time of a command issued over the communication link. Other aspects of resource allocation in accordance with the present description are described.

21 Claims, 5 Drawing Sheets

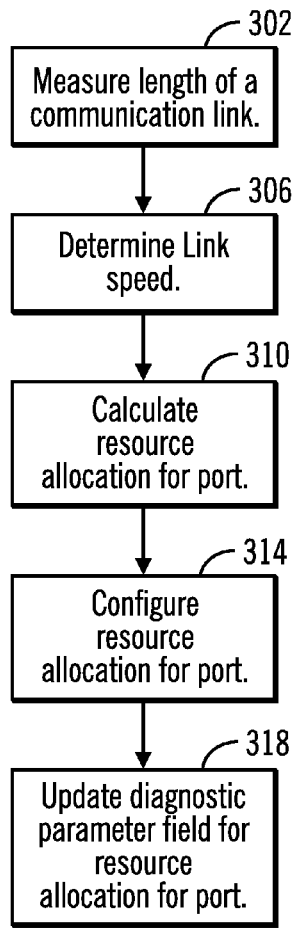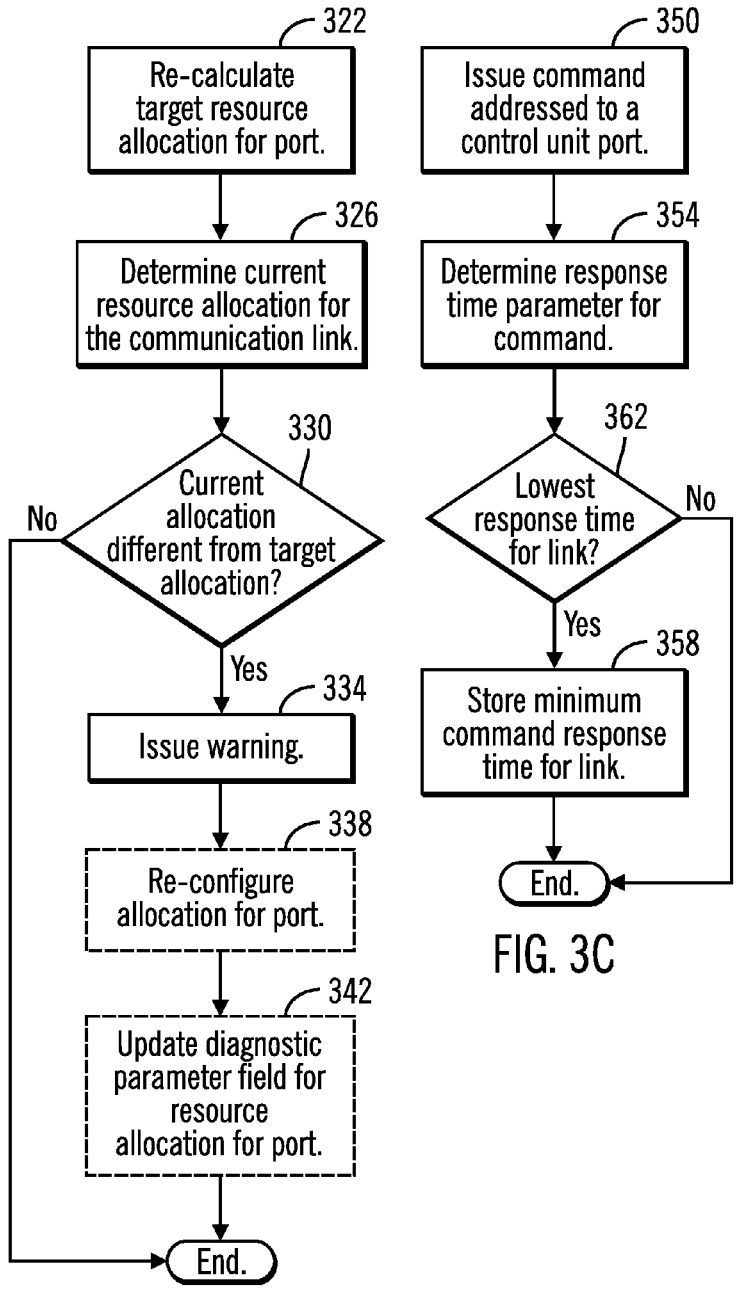
FIG. 3A
FIG. 3B
FIG. 3C

RESOURCE ALLOCATION FOR A STORAGE AREA NETWORK

BACKGROUND OF THE INVENTION

1. Field of the Invention

The present invention relates to a computer program product, system, and method for resource allocation in a storage area network.

2. Description of the Related Art

In certain computing environments, a storage area network provides data paths between multiple host systems and multiple storage control units controlling multiple storage devices e.g., a Direct Access Storage Device (DASD), Redundant Array of Independent Disks (RAID), Just a Bunch of Disks (JBOD), etc. The data paths through the storage area network typically include switches and communication links which may be formed of fiber optic or other types of cables or may be wireless, for example.

Input/output commands issued by a host are directed through the storage area network to a port of a storage control unit. Each control unit port of a storage control unit typically has an address or other identification to distinguish it from other ports of the storage area network.

The data carrying capacity of a storage area network is typically limited by various factors. For example, data carrying channels of the storage area network are frequently designed or configured to support specified data transfer speeds measured in a certain number of data units such as bytes or bits, for example, per second. Accordingly, the data carrying capacity of a particular link is generally limited by the link speed of the communication link.

Further, data traversing a storage area network is frequently temporarily stored in one or more data buffers at various nodes of the storage area network. For example, a switch which couples selected communication links together may buffer data being received from one communication link connected to the switch in preparation for forwarding the buffered data to another communication link connected to the switch. Data may be buffered by the switch for a variety of reasons including the link speeds of the source and destination communication links connected to the switch may not match, or the destination link may be busy transmitting data from another source. Accordingly, data destined for that destination communication link may be buffered until the destination link is ready for it.

Resources utilized by the storage area network to transfer data through the network are limited. For example, the buffer capacity which a switch can provide for any one communication link coupled to that switch may be limited. Accordingly, to provide a degree of control as to the utilization of those limited resources, a resource allocation scheme is often utilized which allocates a certain number of "credits" to a component of the storage area network. For example, a particular port of a communication channel may be allocated a certain number of buffer credits which correspond to particular amounts of buffer capacity assigned to the port for storing data as the data is transferred through that port.

However, certain network conditions such as network congestion, for example, can lead to the assigned buffer capacity provided by the buffer credit allocation being insufficient for the amount of data being transferred. If all the assigned buffer storage provided by the buffer credit allocation is insufficient for the amount of data being transferred through the port, data transfer through that port may be temporarily halted or curbed until additional buffer credits are allocated.

Various schemes are used or proposed to determine how many buffer credits to allocate to a particular port of a channel of a storage area network. For example, the buffer credits may be manually allocated by a user. In one technique, the user may attempt to identify the link speed of a particular communication link and may attempt to identify the length of a particular communication link and arrive at a target buffer credit allocation number by multiplying those factors together. Such manual configuration of buffer credit allocation may result in an improper allocation due to various user errors or may be based upon inaccurate or incomplete information.

Automatic buffer credit allocation techniques have also been proposed. Such automatic allocation has typically been based upon current operating conditions such as detecting degradations in network performance. Another technique bases buffer credit allocation upon determining buffer capacity. Yet another automatic buffer credit allocation technique is based upon a measured data processing speed such as a measured round trip delay to process a frame of data, and is also based upon the number of bytes in the frame, and the speed of the interface in bytes/second.

SUMMARY

Provided are a computer program product, system, and method for resource allocation in accordance with one embodiment of the present description, in which a resource allocation such as a buffer credit allocation for a port in a storage area network is configured as a function of a measurement of a length of a communication link to the port of the storage area network. In one embodiment, the length measurement is a function of a minimum command response time of a command issued over the communication link. In one embodiment, multiple command response time measurements may be made and a running store of the shortest response time may be maintained and used as a minimum command response time.

In another aspect, a data units per second link speed at which the first communication link is currently operating may be obtained and a target resource allocation for a port for the communication link may be calculated as a function of the current link speed of the communication link and the length measurement for the communication link. The resource allocation for the port for the communication link may be automatically configured in accordance with the calculated target resource allocation.

In yet another aspect, the resource allocation at which the port for the communication link is currently configured may be compared to a calculated target resource allocation. If the calculated target resource allocation differs from the current resource allocation at which the port for the communication link was configured, in one option, a warning may be issued. In another option, the resource allocation for the port for the communication link may be automatically reconfigured in accordance with the calculated target resource allocation.

In another aspect of the present description, a switch of the storage area network may be provided a virtual control unit port having an address, and the length of a communication link may be measured by issuing over the communication link a command directed to the virtual control unit port of the switch, receiving over the communication link a response to the command, and measuring a time delay between the issuance of the command and the receipt of the response. The measured delay may be stored as a minimum command response time.

Other aspects of resource allocation in accordance with the present description are described.

BRIEF DESCRIPTION OF THE DRAWINGS

FIGS. 3a-3c illustrate embodiments of operations of a resource allocation control logic in accordance with the present description.

DETAILED DESCRIPTION

Figure 1A:
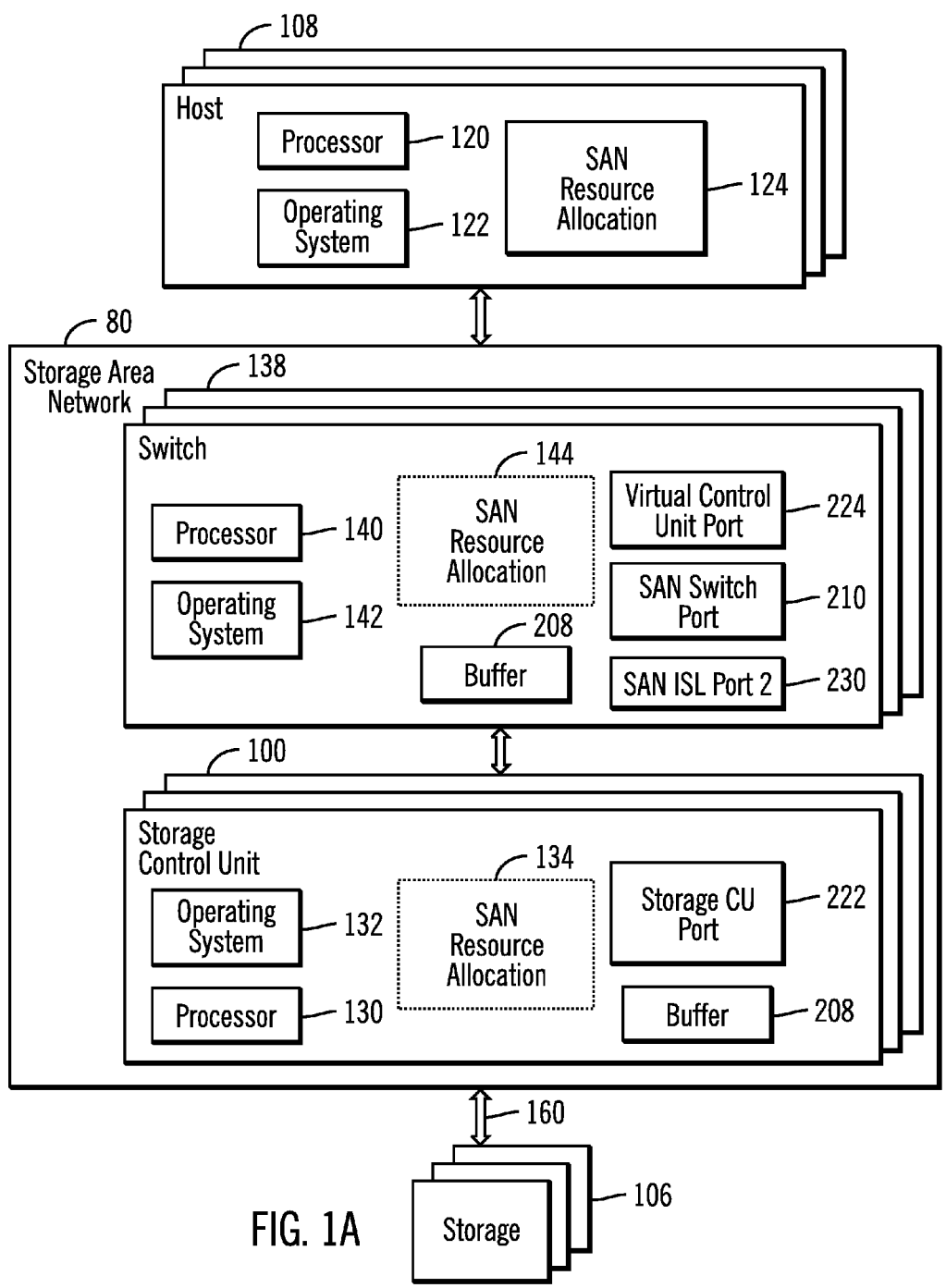
FIG. 1A illustrates an embodiment of a storage environment, employing aspects of resource allocation in accordance with the present description.

Described embodiments provide for allocating resources for a storage area network such as, for example, buffer credits for a port of a communication link of the storage area network. As described in greater detail below, it is believed that resource allocation in accordance with the present description can improve the accuracy of such resource allocation for a component of a storage area network, and as a result, improve system performance. For example, in allocating buffer credits for a port of a communication link in a storage area network, it is appreciated that if too few buffer credits are allocated, system performance can suffer and client service level agreements may not be met. Conversely, if too many buffer credits are assigned to a particular port such that the buffer credits go largely unused by that port, other ports may have a shortage that could have otherwise been satisfied.

In one embodiment, a resource allocation such as a buffer credit allocation, for example, may be automatically configured for a port for a communication link of a storage area network, as a function of the measured length of the communication link. For example, the resource allocations for the ports at each end of the communication link may be configured as a function of the measured length of the communication link between the ports. Thus, in one aspect of the present description, the automatic configuration of the buffer credit allocation for a control unit port, for example, includes automatically measuring the length of the communication link for the port wherein the length is measured as a function of a minimum response time of a command issued over the communication link. As a result, it is believed that a more appropriate buffer credit allocation may be determined automatically and that erroneous manual allocation determinations may be reduced or avoided. Similarly, it is believed that erroneous allocations provided by previous automatic allocations which may be are more susceptible to varying network conditions, may be reduced or eliminated as well.

In one embodiment, the minimum response time of the command upon which the communication link length measurement is based, does not include substantial data processing time such as processing a frame of data. Instead, the minimum command response time is primarily a function of the command bearing signal transmission speed through the transmission medium of the communication link. Thus, the command response time can provide a close approximation of the distance between the source and the target control unit. For example, if the communication link includes a fiber optic cable, it is known that light travels through an optical cable at about one kilometer per 5 microseconds one way, or one kilometer (twice traveled) per 10 microseconds roundtrip. Accordingly, if the minimum command response time is determined to be about a millisecond roundtrip, the length of the optical cable through which the signal passed from one end to the other and back again, may be determined to be approximately 100 kilometers (KM) in length. (Distance=rate X time, or a rate of one KM per 10 microseconds (roundtrip), times 1 millisecond (roundtrip)=100 KM). In this manner, the minimum command response time through a fiber optic communication link is primarily a function of the transmission speed of light through an optical cable and does not include substantially, delays due to data processing, such as delays due to data processing a frame of data, for example.

Furthermore, the command response time of the illustrated embodiment is a minimum response time. For example, the command response time may be measured as the communication link is being initialized and before significant data transfer operations begin to be conducted over the communication link. As a result, the impact of data transfer operations on the command response time measurement may be reduced.

Further, multiple measurements may be automatically taken of the command response time at various times and under various conditions, and the smallest measured response time may be stored as the designated minimum command response time. As a result, effects of transitory conditions such as network congestion may be reduced or eliminated by taking measurements at different times which may have different conditions. Thus, one or more of the measurements of the multiple measurements taken under various conditions, is likely to be under the more optimal conditions which are likely to yield the fastest, that is, the minimum command response time. As a result, the impact of transitory conditions such as network congestion on the determination of the minimum command response time measurement may be reduced.

Storage control units typically have a control unit port which is coupled to a communication link of the storage area network. Each control unit port of the storage control units frequently has a unique address or other identification which allows commands to be directed to a particular control unit port of a storage control unit. Hence, in accordance with the present description, a command may be directed to a particular control unit port of a storage control unit to determine the minimum command response time for that control unit port and as a result, determine the length of the communication link or links to that control unit port, and a resource allocation for that port. In one embodiment, the resource allocation for a control unit port is a function of the link length of the control unit to switch segment of the communication path rather than the entire communication path.

In another aspect of the present description, a virtual control unit port may be provided for other components of the storage area network such as switches of the storage area network. The virtual control unit ports may be individually addressable by commands in the same manner as the physical control unit ports of the storage control units, which allows commands to be directed to a particular virtual control unit port for a switch or other component, for example. Hence, in accordance with the present description, a command may be directed to a particular virtual control unit port of a storage area network component to determine the minimum command response time for that virtual control unit port and as a result, determine the length of the communication link to the storage area network component for that virtual control unit port, and a resource allocation for a port of the component.

In yet another aspect of the present description, a measurement of the length of communication links between components of the storage area network may be made. For example, a data path from a command signal source to a control unit port of a storage control unit may pass through a switch of the storage area network. The length of the data path from the command signal source to the control unit port of the storage control unit may be measured as a function of the minimum command response time for a command directed to the control unit port of the storage control unit as described above. In addition, the length of the data path from the command signal source to a virtual control unit port of the switch positioned between the command signal source and the storage control unit, may be measured as a function of the minimum command response time for a command directed to the virtual control unit port as described above. Hence, the length of the data path from the switch to the control unit port of the storage control unit may be measured as a function of the minimum command response time between the command signal source and the storage control unit port, less the minimum command response time between the command signal source and the virtual control unit port of the switch.

In another aspect of the present description, a resource allocation such as a buffer credit allocation, for example, may be automatically configured not only as a function of automatic measurement of the length of a communication link of the storage area network, but also as a function of automatic retrieval of a current data units/second link speed at which the particular communication link is currently operating. For example, communication links in accordance with various communication protocols may support various link speeds such as 1, 2, 4, 8 and 16 Gbs. The particular link speed at which a particular communication link is currently operating may be determined using various techniques. For example, in the Fibre Channel standard, Read Diagnostic Parameters (RDP) are provided from the SAN entry point, exit point and the target control unit port, and may be automatically retrieved for resource allocation. In another embodiment, the resource allocation for a port may be configured based upon the maximum supported link speed.

Accordingly, in one embodiment, a resource allocation such as a buffer credit allocation, for example, may be automatically configured by automatically measuring the length of the communication link as a function of the minimum command response time as discussed above, automatically retrieving the current link speed for the particular communication link as provided by the RDP data for the communication link, and automatically calculating a target buffer credit allocation for the ports of the communication link as a function of the product of the measured communication link length and the retrieved communication link speed. As a result, it is believed that a more appropriate buffer credit allocation for the ports of the link may be determined and configured automatically, such that erroneous allocations due to manual allocations or automatic allocations more dependent upon transitory network conditions, may be reduced or avoided. In one embodiment, an appropriate buffer credit allocation may be determined for each port in the data path between a host and a control unit, including the host port, the switch port to which it is connected, the control unit port and the switch port to which the control unit is connected. Each communication link segment of the data path may be operating (or capable of operating) at a different link speed and thus the optimal buffer credit allocation may be different for each pair of ports at the respective ends of the particular communication link.

Although described in one embodiment in connection with fiber channel links and the Fibre Connection (FICON) communication protocol, it is appreciated that resource allocation for a storage area network in accordance with the present description may be applied to other types of communication links and protocols. For example, resource allocation in accordance with the present description may be utilized for components complying with the Extended Link Services (ELS) protocol.

FIG. 1A illustrates an embodiment of a computing environment including a storage area network 80 having one or more storage control units, such as a server or storage control unit 100, that manages access to data stored in one or more storage devices such as a storage 106, by one or more hosts as represented by a host 108 (FIG. 1A). The storage area network provides data paths for input/output data transfer operations between the storage control units 100 and the hosts 108.

In one embodiment, each storage control unit 100 may be a primary storage control unit 100a (FIG. 1B) for a primary storage 106a similar to the storage 106 (FIG. 1A), or may be a secondary storage control unit 100b for a secondary storage 106b similar to the storage 106 (FIG. 1A). Data may be stored in the form of storage volumes of the storage devices 106a, 106b (FIG. 1A), which may be in a peer-to-peer mirror relationship such that data written to one storage volume, typically a primary storage volume in the primary storage 106a, is mirrored to a corresponding secondary storage volume in the secondary storage 106b such that the secondary storage volume is a copy of the primary storage volume. The source of the data written to the storage volumes is typically one or more of the hosts 108. Thus, the hosts 108 issue input/output requests over the storage area network 80 to a storage control unit 100 requesting the storage control unit 100 to read data from or write data to the storage volumes of the storage 106 controlled by the storage control unit 100. It is appreciated that resource allocation in accordance with the present description is applicable to other data processing environments in addition to storage environments having storage volumes in a mirrored, peer-to-peer relationship.

Figure 1B:
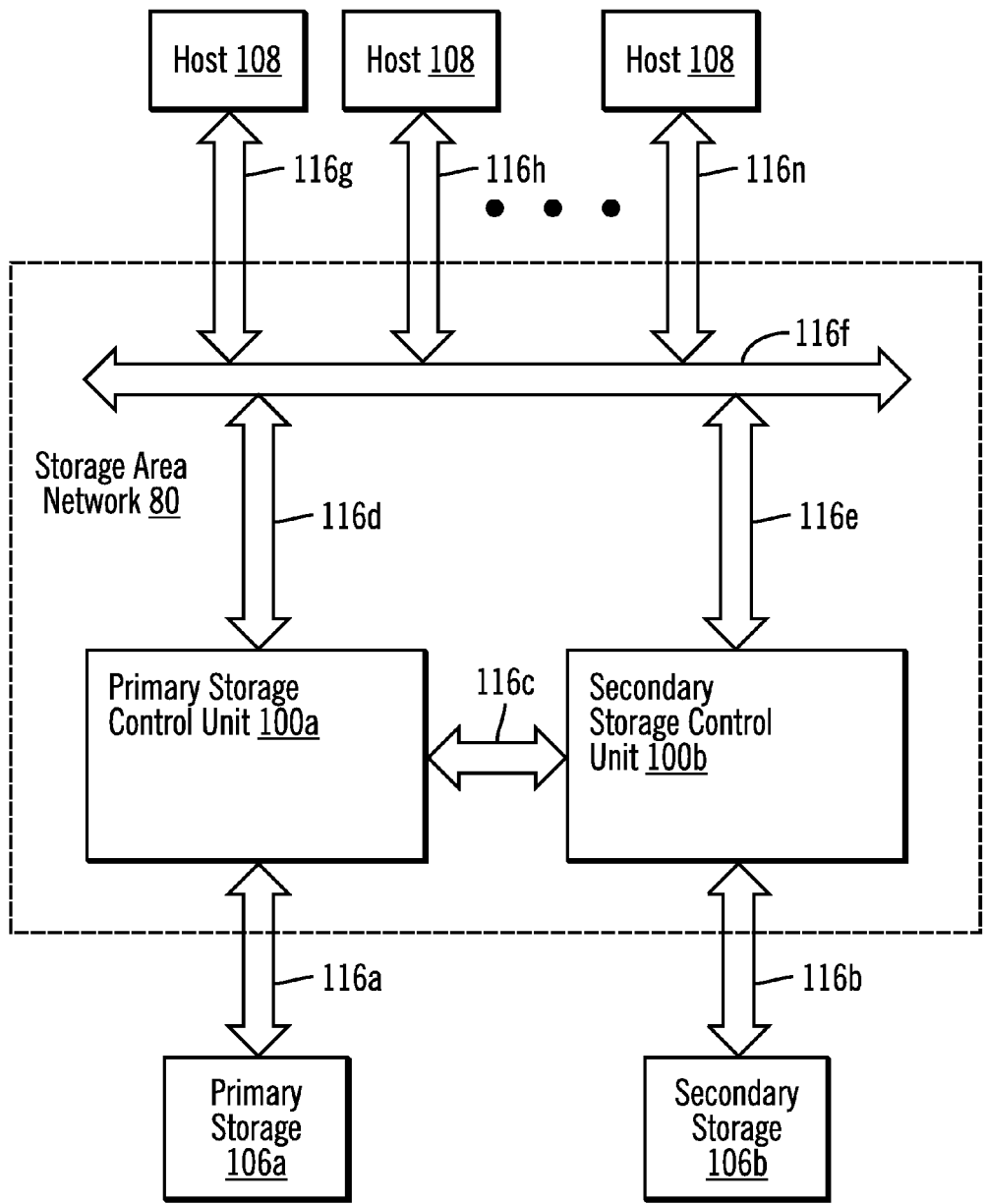
FIG. 1B illustrates another embodiment of a storage environment, employing aspects of resource allocation in accordance with the present description.

The computing environment of FIGS. 1A, 1B includes multiple processing nodes within the hosts 108 and the storage area network 80. Aspects of resource allocation in accordance with the present description for the storage area network 80 may be implemented in one or more of such processing nodes. For example, each host 108 includes a processor 120, an operating system 122 and various software applications. The operating system 122 may comprise the IBM z/OS® operating system or other operating systems for managing input/output operations through a storage area network. (IBM and z/OS are trademarks of IBM worldwide).

Resource allocation control logic 124 of a host 108 manages aspects of allocation of resources such as storage buffer credits for ports of communication links of the storage area network 80, and may be implemented with hardware, software, firmware or any combination thereof. Thus resource allocation control logic 124 may be separate from the operating system 122 or may be included within the operating system 122, for example.

Similarly, each storage control unit 100 includes a processor 130, an operating system 132 and may include various software applications. The operating system 132 may comprise the IBM z/OS® operating system or other operating systems for managing storage devices in a storage area network. In one embodiment, a storage control unit 100 may optionally include resource allocation control logic 134 in addition to or instead of the resource allocation control logic 124 of a host 108, to manage aspects of allocation of resources such as storage buffer credits for ports of communication links of the storage area network 80. The control logic 134 may be implemented with hardware, software, firmware or any combination thereof. Thus resource allocation control logic 134 may be separate from the operating system 132 or may be included within the operating system 132, for example.

The storage area network 80 further comprises a plurality of switches 138 which are configured to switch data paths within the storage area network to provide for data transfers from a selected host 108 to a selected storage control unit 100. In this embodiment, each switch 138 includes a processor 140, an operating system 142 and may include various software applications. The operating system 142 may comprise an appropriate switch operating system or other operating systems for managing data paths in a storage area network. In one embodiment, a switch 138 may optionally include resource allocation control logic 144 in addition to or instead of the resource allocation control logic 124 of a host 108 or the resource allocation control logic 134 of a storage control unit 100, to manage aspects of allocation of resources such as storage buffer credits for ports of communication links of the storage area network 80. The control logic 144 may be implemented with hardware, software, firmware or any combination thereof. Thus resource allocation control logic 144 may be separate from the operating system 142 or may be included within the operating system 142, for example.

Figure 2:
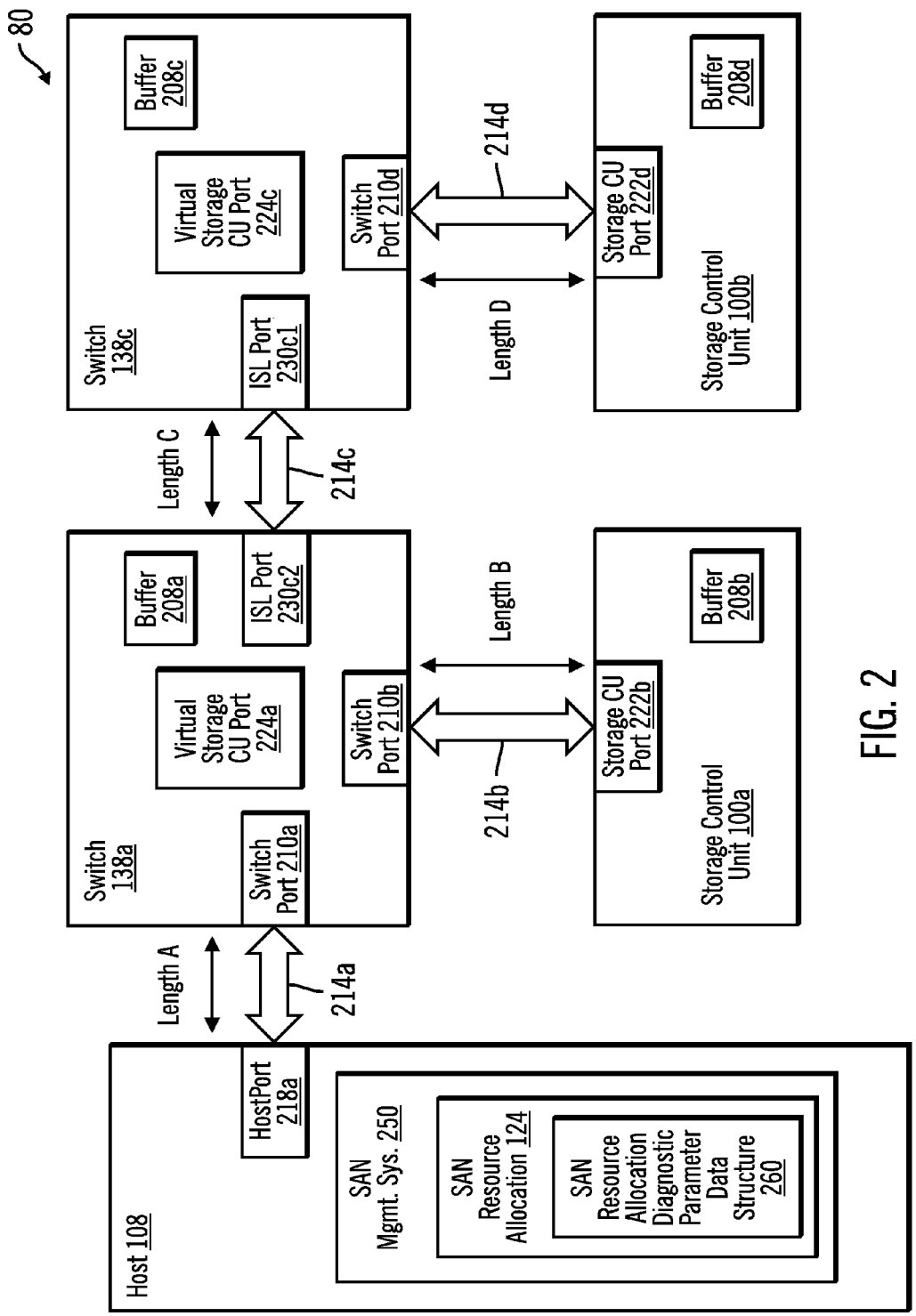
FIG. 2 illustrates another embodiment of a storage environment, employing aspects of resource allocation in accordance with the present description.

Various components of the storage area network 80 have ports, each port being coupled to a communication link interconnecting the component to a host or another component of the storage area network. FIG. 2 shows an example of a switch 138a of the storage area network 80, having a buffer 208a of the buffers 208 (FIG. 1A) and a switch port 210a of the switch ports 210 (FIG. 1A), coupled by a communication link 214a to a host port 218a for the host 108, each of which is configured for data transfers between the host 108 and the switch 138a. The host port 218a may be a part of a host adapter, or a part of the host 108 or another intermediate device.

The storage control unit 100a has a storage buffer 208b and the switch 138a of the storage area network 80 further has a switch port 210b coupled by a communication link 214b to a storage control unit port 222b for the storage control unit 100a, each of which is configured for data transfers between host 108 and the storage control unit 100a, via the switch 138a. As explained in greater detail below, the switch 138a of the storage area network 80 has a virtual storage control unit port 224a to facilitate a measurement of the length or distance A of the communication link 214a between the host 108 and the switch 138a, for purposes of allocation of buffer credits for the switch ports 210a, 210b or for the storage control unit port 222b.

A switch 138c of the storage area network 80, has a buffer 208c of the buffers 208 (FIG. 1A) and an inter switch link (ISL) port 230c1 of the ISL ports 230 (FIG. 1A), coupled by a communication link 214c to an ISL port 230c2 of the switch 138a, each of which is configured for data transfers between the switch 138a and the switch 138c. The storage control unit 100b has a storage buffer 208d and the switch 138c of the storage area network 80 further has a switch port 210d coupled by a communication link 214d to a storage control unit port 222d for the storage control unit 100b, each of which is configured for data transfers between host 108 and the storage control unit 100b, via the switches 138a, 138c. As explained in greater detail below, the switch 138c of the storage area network 80 has a virtual storage control unit port 224c to facilitate a measurement of the length or distance C of the communication link 214c between the switch 138a and the switch 138c, for purposes of allocation of buffer credits for the switch port 210d or the storage control unit port 222d.

The storage 106 (FIG. 1A), 106a, 106b (FIG. 1B) may comprise one or more storage devices known in the art, such as a solid state storage device (SSD) comprised of solid state electronics, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The storage control unit 100 communicates with the storage 106 via connection 160. The components of the embodiment depicted in FIG. 1B are similarly interconnected by connections 116a, 116b . . . 116n. The connections 116, 116a, 116b . . . 116n each may comprise one or more networks, such as a Local Area Network (LAN), Storage Area Network (SAN), Wide Area Network (WAN), peer-to-peer network, wireless network, etc. Alternatively, the connections 116, 116a, 116b . . . 116n may comprise bus interfaces, such as a Peripheral Component Interconnect (PCI) bus or serial interface.

FIGS. 3a-3c illustrate embodiments of aspects of operations performed by a resource allocation logic such as a resource allocation control logic 124, 134, or 144 (FIG. 1A) for configuration of components of the storage area network in accordance with the present description. FIG. 3a is directed to one embodiment of configuration operations which includes automatic configuration of the allocation of buffer storage credits for a port of a communication link of a storage area network, in accordance with the present description.

In one operation, a storage area network (SAN) resource allocation control logic such as the SAN resource allocation control logic 124 (FIG. 2) of a storage area network (SAN) management system logic 250 for a host 108, has logic which automatically measures (block 302) the length of the communication link to the port which is being configured, such as the port 210a for the communication link 214a of FIG. 2. As explained in greater detail below, the communication link length measurement of one embodiment is a function of an initial minimum command response time in connection with a command sent over the communication link for the port being configured.

In another operation, the current speed of the communication link to the port being configured is automatically determined (block 306). In one embodiment, such a link speed may be determined by logic of the SAN resource allocation logic 124 retrieving diagnostic parameter data provided in accordance with the particular communication protocol of the communication link. Thus, in the case of a communication link complying with the Fibre Channel protocol, the end-to-end link speed of the communication link, such as the link 214a, for example, may be determined by examining the RDP diagnostic parameter data provided by an operating system such as the operating system of the host 108.

Using the length measurement (block 302) data and the link speed data (block 306), a target value for the resource allocation, such as, for example, the storage buffer credit may be automatically calculated (block 310). In one embodiment, the storage buffer credit allocation may be calculated as a function of the product of the link length measurement and the link speed data. It is appreciated that a resource allocation such as a storage buffer credit allocation may be calculated using a variety of algorithms as a function of a communication link length measurement.

Upon calculating (block 310) the target value for the storage buffer credit allocation, the storage buffer credits to be allocated to the particular port for the communication link may be configured (block 314) to the target value calculated (block 310) for the port associated with the communication link. In addition, the target value at which the storage buffer credit allocation was configured (block 314) may be stored (block 318) in a field of a data structure 260 (FIG. 2) storing SAN diagnostic parameter data such as RDP diagnostic parameter data.

Although it is not anticipated that the length of the communication link will change over time, it is appreciated that the communication link length measurement data may vary somewhat over time due to changing conditions. It is further appreciated that the negotiated link speed for the communication link may change over time. Accordingly, FIG. 3b is directed to an embodiment of automatic configuration operations which periodically recalculates the target resource allocation value to facilitate achieving improved system performance notwithstanding changing conditions.

As previously mentioned, the resource allocation for a communication link such as a buffer credit allocation for a control unit port, for example, may, in one embodiment, be configured prior to commencing full scale data transfer operations over the communication link to facilitate determining the minimum command response time. However, it is appreciated that transitory network conditions may nonetheless be present when the resource allocation for the communication link was configured. Accordingly, at a subsequent time, the target resource allocation for the communication link may be re-calculated (block 322) in a manner similar to the original calculation performed as described above in connection with FIG. 3a.

The current resource allocation for the communication link may be determined (block 326) by, for example, retrieving the resource allocation value stored in the SAN resource allocation diagnostic parameter data structure 260 (FIG. 2) and comparing it to the re-calculated (block 322) target resource allocation. If the current and target resource allocation values do not match (block 330) or otherwise differ by more than a predetermined margin for the port for the communication link, in one embodiment, a warning (block 334) may be issued to the user. In response, the user may re-configure the resource allocation for the port for the communication link to a higher or lower value depending upon whether the re-calculated target value for the resource allocation is higher or lower than the current resource allocation value for the port.

In another embodiment, the resource allocation control logic may optionally automatically re-configure (block 338) the resource allocation for the port for the communication link so that the re-configured current resource allocation for the port matches or more closely matches the target value re-calculated for the resource allocation for the port. In addition, the target value at which the storage buffer credit allocation was reconfigured (block 314) may be stored to update (block 342) the resource allocation field of the data structure 260 (FIG. 2) storing SAN diagnostic parameter data such as RDP diagnostic parameter data for the port being configured.

After a suitable interval, the operations of FIG. 3b may be repeated to re-calculate the target resource allocation value for the port for the communication link and to issue a warning or reconfigure the resource allocation as appropriate. In one embodiment, the host initiates a command response time measurement in connection with each input/output data transfer operation. Accordingly, in one embodiment the operations of FIG. 3b may be repeated in connection with each input/output operation over the communication link. However, it is appreciated that in other embodiments, the operations of FIG. 3b may be repeated more or less frequently, depending upon the particular application. Moreover, the operations of FIG. 3b may be repeated at fixed intervals or may be repeated in response to the occurrence of various events, again depending upon the particular application.

As previously mentioned, although it is not anticipated that the length of the communication link will change over time, it is appreciated that the communication link length measurement data may vary somewhat over time due to changing conditions. In addition, communication links may be reconfigured such that the length of a particular communication link may be changed by the user. FIG. 3c is directed to an embodiment of configuration operations which periodically measures or re-measures the minimum command response time over the subject communication link to facilitate achieving improved system performance notwithstanding changing conditions.

The communication link length measurement for the initial resource allocation described above in connection with FIG. 3a may, in one embodiment, be performed prior to commencing full scale data transfer operations over the communication link to facilitate determining the minimum command response time. However, it is appreciated that the resource allocation may be configured at other times and under other conditions, depending upon the particular application.

Accordingly, the initial minimum command response time for the communication link may be measured by issuing (block 350) a command over the subject communication link and directed to the physical or virtual control unit port at the end of the link. In one embodiment, the operating system provides (block 354) a measurement of the command response time, often referred to as the initial command response time. For example, in the Fibre Connection (FICON) protocol, the channels have instrumentation that allows the system to isolate the round trip time for a signal between a source and a destination. Thus, using this FICON capability, an initial command response time may be measured as the time delay between the issuance of the command by the host over a data path to an addressable port and the receipt of a response to that command over the data path. It is appreciated that the transit time for a signal through a communication link may be obtained using other techniques and other communication protocols, depending upon the particular application.

The initial command response time measured by the operating system may be made available for retrieval by the resource allocation control logic. As noted above, in some operating systems, the initial command response time for a communication link is determined in connection with each input/output data transfer operation initiated by the host 108 over the communication link.

If the measurement (block 354) is the first measurement of the initial command response time, the initial command response time is stored (block 358) in a suitable data structure and designated the current initial minimum command response time for the link. If the measurement (block 354) is a re-measurement of the command response time, the re-measured initial command response time is compared (block 362) to the stored current minimum initial command response time. If the re-measured initial command response time is determined (block 362) to be lower than the stored current minimum initial command response time, the re-measured initial command response time is stored (block 358) to replace the prior stored command response time, and is designated the current minimum initial command response time for the link. Conversely, if the re-measured initial command response time is determined (block 362) to be greater than the stored current minimum initial command response time, the re-measured initial command response time may be discarded by bypassing the storing operation of block 358. In this manner, a portion of the resource allocation control logic which may be a part of the operating system, for example, maintains a running store of the minimum initial command response time and if a re-measurement of the initial command response time provides a lower value due to changed conditions, the running store is updated with the new, lower minimum initial command response time. In this manner, the minimum initial command response time length measurement of the illustrated embodiment provides a measurement under the most favorable measurement conditions experienced notwithstanding the changing of the conditions under which the measurements take place.

After a suitable interval, the operations of FIG. 3c may be repeated to re-measure the communication link length and update the current minimum command response time as appropriate. In one embodiment, the host initiates a command response time measurement in connection with each input/output operation. Accordingly, in one embodiment the operations of FIG. 3c may be repeated in connection with each input/output operation over the communication link. However, it is appreciated that in other embodiments, the operations of FIG. 3c may be repeated more or less frequently, depending upon the particular application. Moreover, the operations of FIG. 3c may be repeated at fixed intervals or may be repeated in response to the occurrence of various events, again depending upon the particular application.

Referring to FIG. 2, in the illustrated embodiment, the SAN resource allocation control logic can measure the length of the communication link 214a by issuing a command over the communication link 214a to a virtual control unit port 224a on the switch 138a at the end of the link 214a, and retrieving an initial minimum command response time. The command response time provides a measure of the length of the link 214a as described above. In one embodiment, the virtual control unit port 224a may be implemented in a manner similar to a physical control unit port such as the storage control unit port 222b of the storage control unit 100a. Thus, the virtual control unit port 224a may have a unique address or other unique identification which would permit the host 108 to issue a command directed to the virtual storage control unit port 224a and receive a measure of the initial response time of that command directed to the virtual port 224a. However, in one embodiment, as a virtual device, the operations of the virtual storage control unit port 224a may be restricted to distance measurement operations between the host 108 and the switch 138a for resource allocation purposes, and thus may not participate in actual data transfer operations in the manner of physical storage control units ports such as the storage control unit port 222b of the storage control unit 100a. Accordingly, the capabilities of the virtual storage control unit port may be limited as compared to a physical control unit port, to facilitate adding virtual control unit port logic to a SAN switch.

It is seen that the buffer credit allocation for the switch port 210a of the switch 138a, for example, may be readily and automatically configured or reconfigured. More specifically, the buffer credit allocation for the switch port 210a of the switch 138a may be determined as a function of the length A of the command link 214a. The length A of the command link 214a may be measured as a function of the minimum command response time of a command issued from the host port 218a for the host 108, over the communication link 214a and addressed to the virtual storage control unit port 224a of the switch 138a as described above. The initial command response time for this command is retrieved by the resource allocation logic as is the link speed for the communication link 214a as indicated by the RDP diagnostic parameter data. The target buffer credit allocation for the port 210a may be calculated as a function of the minimum command response time over the link 214a and the negotiated link speed of the link 214a, as described above.

In some embodiments, the buffer credit allocation for the other ports of the storage area network may be readily and automatically configured or reconfigured in a similar manner. However, it is appreciated that in some embodiments, an appropriate buffer credit allocation for a particular port may be more accurately calculated as a function of the length of a portion of a data path between the host 108 and the particular port, in contrast to the entire length of the data path. For example, it is believed that the buffer credit allocation for the storage control unit port 222b of the storage control unit 100a may be more appropriately calculated as a function of the length B of the communication link 214b instead of the combined lengths A and B of the communication links 214a and 214b, respectively of the total data path between the host 108 and the storage control unit port 222b of the storage control unit 100a.

Accordingly, in one aspect of the present description, the buffer credit allocation for the control unit port 222b of the storage control unit 100a may be determined as a function of the length B of the communication link 214b. More specifically, the combined lengths A and B of the command links 214a and 214b, respectively, may be measured as a function of the minimum command response time of a second command issued from the host port 218a for the host 108, over both of the communication links 214a and 214b and addressed to the physical storage control unit port 222b of the storage control unit 100a. The initial command response time for this second command is retrieved by the resource allocation logic. As noted above, the length A of the command link 214a may be measured as a function of the minimum command response time of the first command issued from the host port 218a for the host 108, over the communication link 214a and addressed to the virtual storage control unit port 224a of the switch 138a. The length B of the communication link 214b may be readily determined as a function of the minimum command response time over the link 214b which is a function of the minimum command response time of the second command issued from the host port 218a for the host 108, over both of the communication links 214a and 214b and addressed to the physical storage control unit port 222b of the storage control unit 100a, less the minimum command response time of the first command issued from the host port 218a for the host 108, over the communication link 214a and addressed to the virtual storage control unit port 224a of the switch 138a. Accordingly, the target buffer credit allocation for the port 222b may be calculated as a function of the minimum command response time over the link 214b and the current negotiated link speed of the link 214b which may be retrieved form the RDP diagnostic parameter data, as described above.

In a similar manner, the buffer credit allocation for the control unit port 222d of the storage control unit 100b may be determined as a function of the length D of the communication link 214d. More specifically, the combined lengths A, C and D of the command links 214a, 214c and 214d, respectively, may be measured as a function of the minimum command response time of a third command issued from the host port 218a for the host 108, over the three communication links 214a, 214c and 214d and addressed to the physical storage control unit port 222d of the storage control unit 100d. The initial command response time for this third command is retrieved by the resource allocation logic. Also, the combined lengths A and C of the command links 214a and 214c, respectively may be measured as a function of the minimum command response time of a fourth command issued from the host port 218a for the host 108, over the communication links 214a and 214c and addressed to the virtual storage control unit port 224c of the switch 138b. The length D of the communication link 214d may be readily determined as a function of the minimum command response time over the link 214d which is a function of the minimum command response time of the third command issued from the host port 218a for the host 108, over the three communication links 214a, 214c and 214d and addressed to the physical storage control unit port 222d of the storage control unit 100b, less the minimum command response time of the fourth command issued from the host port 218a for the host 108, over the communication links 214a and 214c and addressed to the virtual storage control unit port 224c of the switch 138c. Accordingly, the target buffer credit allocation for the port 222d may be calculated as a function of the minimum command response time over the link 214d and the current negotiated link speed of the link 214d which may be retrieved form the RDP diagnostic parameter data, as described above.

Figure 4:
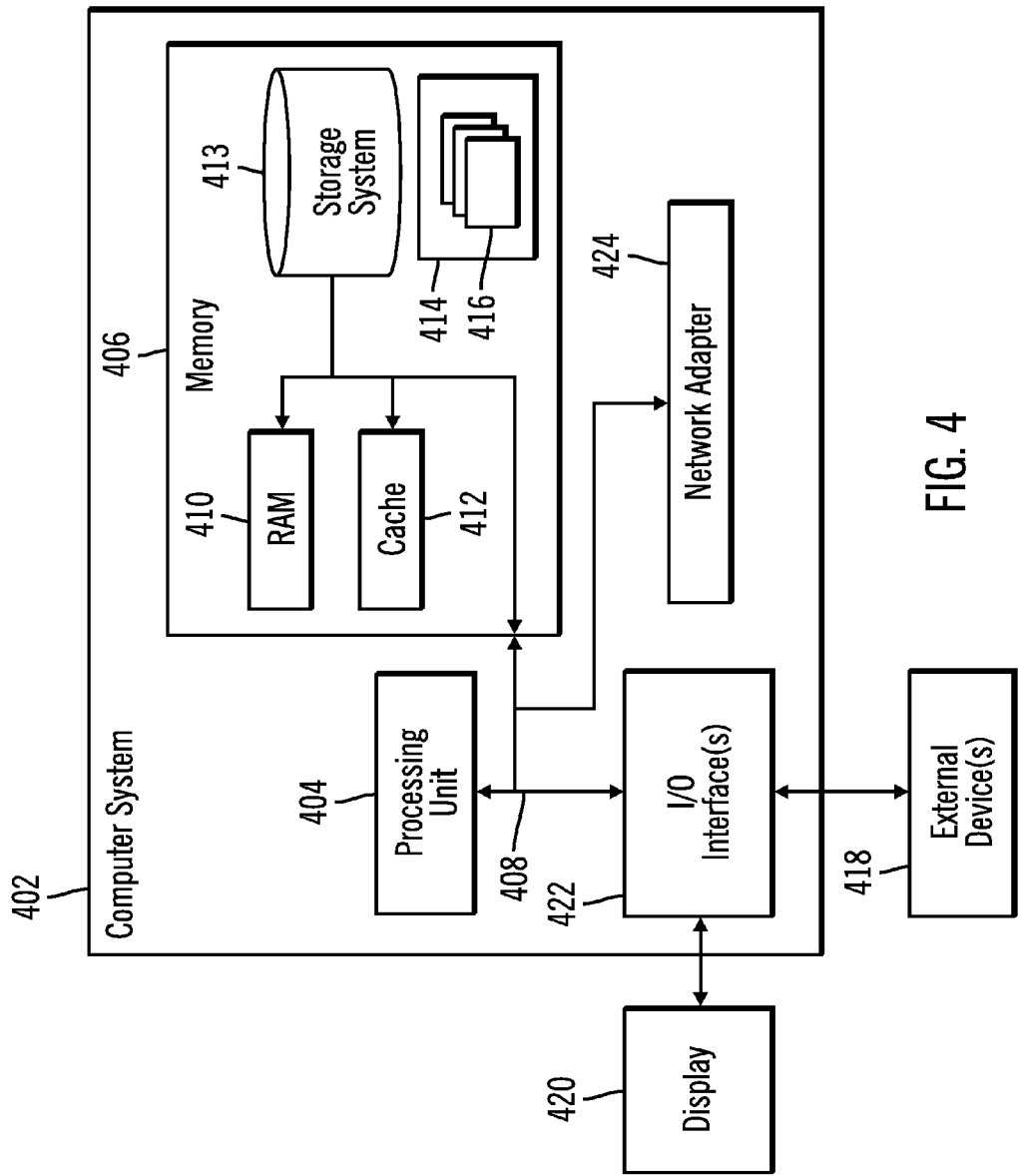
FIG. 4 illustrates a computing environment in which the components of FIGS. 1A, 1B and 2 may be implemented.

The computational components of FIGS. 1A, 1B, and 2 including the host 108, switches 138 and the controller or storage control unit 100, 100a, 100b, may each be implemented in one or more computer systems, such as the computer system 402 shown in FIG. 4. Computer system/server 402 may be described in the general context of computer system executable instructions, such as program modules, being executed by a computer system. Generally, program modules may include routines, programs, objects, components, logic, data structures, and so on that perform particular tasks or implement particular abstract data types. Computer system/server 402 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, the computer system/server 402 is shown in the form of a general-purpose computing device. The components of computer system/server 402 may include, but are not limited to, one or more processors or processing units 404, a system memory 406, and a bus 408 that couples various system components including system memory 406 to processor 404. Bus 408 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 402 typically includes a variety of computer system readable media. Such media may be any available media that is accessible by computer system/server 402, and it includes both volatile and non-volatile media, removable and non-removable media.

System memory 406 can include computer system readable media in the form of volatile memory, such as random access memory (RAM) 410 and/or cache memory 412. Computer system/server 402 may further include other removable/non-removable, volatile/non-volatile computer system storage media. By way of example only, storage system 413 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 408 by one or more data media interfaces. As will be further depicted and described below, memory 406 may include at least one program product having a set (e.g., at least one) of program modules that are configured to carry out the functions of embodiments of the invention.

Program/utility 414, having a set (at least one) of program modules 416, may be stored in memory 406 by way of example, and not limitation, as well as an operating system, one or more application programs, other program modules, and program data. Each of the operating system, one or more application programs, other program modules, and program data or some combination thereof, may include an implementation of a networking environment. The components of the computer 402 may be implemented as program modules 416 which generally carry out the functions and/or methodologies of embodiments of the invention as described herein. The systems of FIGS. 1A, 1B may be implemented in one or more computer systems 402, where if they are implemented in multiple computer systems 402, then the computer systems may communicate over a network.

Computer system/server 402 may also communicate with one or more external devices 418 such as a keyboard, a pointing device, a display 420, etc.; one or more devices that enable a user to interact with computer system/server 402; and/or any devices (e.g., network card, modem, etc.) that enable computer system/server 402 to communicate with one or more other computing devices. Such communication can occur via Input/Output (I/O) interfaces 422. Still yet, computer system/server 402 can communicate with one or more networks such as a local area network (LAN), a general wide area network (WAN), and/or a public network (e.g., the Internet) via network adapter 424. As depicted, network adapter 424 communicates with the other components of computer system/server 402 via bus 408. It should be understood that although not shown, other hardware and/or software components could be used in conjunction with computer system/server 402. Examples, include, but are not limited to: microcode, device drivers, redundant processing units, external disk drive arrays, RAID systems, tape drives, and data archival storage systems, etc.

The reference characters used herein, such as i, j, and n, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method comprising:
   measuring in a first length measurement, a length of a first communication link of a storage area network of a plurality of devices wherein the first length measurement is a function of a first minimum command response time of a command issued over the first communication link;
   obtaining a current data units per second link speed of the first communication link;
   calculating a first target resource allocation for a first port at a first end of the first communication, and for a second port at a second end of the first communication link as a function of the data units per second link speed of the first communication link and the first length measurement for the first communication link; and
   configuring a resource allocation for the first and second ports for the first communication link in accordance with the calculated first target resource allocation;
   wherein the second port has an address, and wherein the measuring a length of the first communication link comprises:
   issuing over the first communication link a first command directed to the second port;
   receiving over the first communication link a first response to the first command;
   measuring a first time delay between the issuance of the first command and the receipt of the first response;
   issuing a second command over the first communication link and directed to the second port;
   receiving a second response over the first communication link to the second command;
   measuring a second time delay between the issuance of the second command and the receipt of the second response; and
   storing a value as said first minimum command response time which is the lesser of the first and second time delays.

2. The method of claim 1 further comprising:
   comparing the calculated first target resource allocation for the first and second ports for the first communication link to a current resource allocation for the first and second ports for the first communication link; and
   issuing a warning if the calculated first target resource allocation differs from the current resource allocation.

3. The method of claim 2 further wherein the configuring includes reconfiguring the resource allocation for the first and second ports for the first communication link in accordance with the comparison of the calculated first target resource allocation and the current resource allocation.

4. The method of claim 2 wherein the first communication link includes a fiber optic cable and wherein the resource allocation is a buffer storage credit for a unit of buffer storage of the storage area network.

5. The method of claim 1 wherein the second port is a switch port of a switch which further has a virtual control unit port having an address, and wherein the measuring a length of the first communication link comprises,
   issuing over the first communication link a first command directed to the virtual control unit port of the switch;
   receiving over the first communication link a first response to the first command;
   measuring a first time delay between the issuance of the first command and the receipt of the first response; and
   storing a value as a function of said first time delay as said first minimum command response time.

6. The method of claim 1 further comprising measuring the length of a second communication link of a data path of the storage area network wherein the data path includes both the second communication link and the first communication link, wherein the measuring the length of the second communication link is a function of a second minimum command response time of a command issued over both the second communication link and the first communication link, less the first minimum command response time of a command issued over the first communication link.

7. The method of claim 1 further comprising storing the resource allocation at which the first and second ports for the first communication link were configured in a diagnostic parameter data structure.

8. A computer program product for providing a storage area network management system to manage resource allocation in a storage area network of a computing system having at least one host and at least one storage unit, the storage area network having at least one switch, at least one communication link, at least one port, and at least one storage control unit for controlling a storage unit, wherein the computer program product comprises a computer readable storage medium having program instructions embodied therewith, the program instructions executable by a processor of the storage area network management system to cause operations, the operations comprising:

measuring in a first length measurement, a length of a first communication link of a storage area network wherein the first length measurement is a function of a first minimum command response time of a command issued over the first communication link;

obtaining a current data units per second link speed of the first communication link;

calculating a first target resource allocation for a first port at a first end of the first communication link, and for a second port at a second end of the first communication link as a function of the data units per second link speed of the first communication link and the first length measurement for the first communication link; and configuring a resource allocation for the first and second ports for the first communication link in accordance with the calculated first target resource allocation;

wherein the second port has an address, and wherein the measuring a length of the first communication link comprises, issuing over the first communication link a first command directed to the second port;

receiving over the first communication link a first response to the first command;

measuring a first time delay between the issuance of the first command and the receipt of the first response;

issuing a second command over the first communication link and directed to the second port;

receiving a second response over the first communication link to the second command;

measuring a second time delay between the issuance of the second command and the receipt of the second response; and storing a value as said first minimum command response time which is the lesser of the first and second time delays.

9. The computer program product of claim 8 wherein the operations further comprise:

comparing the calculated first target resource allocation for the first and second ports for the first communication link to a current resource allocation for the first and second ports for the first communication link; and issuing a warning if the calculated first target resource allocation differs from the current resource allocation.

10. The computer program product of claim 9 wherein the configuring includes reconfiguring the resource allocation for the first and second ports for the first communication link in accordance with the comparison of the calculated first target resource allocation and the current resource allocation.

11. The computer program product of claim 9 wherein the storage area network has at least one buffer storage, wherein the first communication link includes a fiber optic cable and wherein the resource allocation is a buffer storage credit for a unit of buffer storage of the storage area network.

12. The computer program product of claim 8 wherein the second port is a switch port of a switch which further has a virtual control unit port having an address, and wherein the measuring a length of the first communication link comprises, issuing over the first communication link a first command directed to the virtual control unit port of the switch;

receiving over the first communication link a first response to the first command;

measuring a first time delay between the issuance of the first command and the receipt of the first response; and storing a value as a function of said first time delay as said first minimum command response time.

13. The computer program product of claim 8 wherein the storage area network has a data path and wherein the operations further comprise:

measuring the length of a second communication link of a data path of the storage area network wherein the data path includes both the second communication link and the first communication link, wherein the measuring the length of the second communication link is a function of a second minimum command response time of a command issued over both the second communication link and the first communication link, less the first minimum command response time of a command issued over the first communication link.

14. The computer program product of claim 8 wherein the storage management system further has a diagnostic parameter data structure, and wherein the operations further comprise storing the resource allocation at which the first and second ports for the first communication link were configured in the diagnostic parameter data structure.

15. A computing system, comprising:

at least one host;

at least one storage unit; and a storage area network having at least one switch, at least one communication link, at least one port, and at least one storage control unit for controlling a storage unit;

wherein at least one of the host and the storage area network has a processor and a computer program product for providing a storage area network management system to manage resource allocation in the storage area network wherein the computer program product comprises a computer readable storage medium having program instructions embodied therewith, the program instructions executable by a processor of the storage area network management system to cause operations, the operations comprising:

measuring in a first length measurement, a length of a first communication link of a storage area network wherein the first length measurement is a function of a first minimum command response time of a command issued over the first communication link;

obtaining a current data units per second link speed of the first communication link;

calculating a first target resource allocation for a first port at a first end of the first communication link, and for a second port at a second end of the first communication link as a function of the data units per second link speed of the first communication link and the first length measurement for the first communication link; and configuring a resource allocation for the first and second ports for the first communication link in accordance with the calculated first target resource allocation;

wherein the second port has an address, and wherein the measuring a length of the first communication link comprises, issuing over the first communication link a first command directed to the second port;

receiving over the first communication link a first response to the first command;

measuring a first time delay between the issuance of the first command and the receipt of the first response;

issuing a second command over the first communication link and directed to the second port;

receiving a second response over the first communication link to the second command;

measuring a second time delay between the issuance of the second command and the receipt of the second response; and storing a value as said first minimum command response time which is the lesser of the first and second time delays.

16. The system of claim 15 wherein the operations further comprise:

comparing the calculated first target resource allocation for the first and second ports for the first communication link to a current target resource allocation for the first and second ports for the first communication link; and issuing a warning if the calculated first target resource allocation differs from the current resource allocation.

17. The system of claim 16 wherein the configuring includes reconfiguring the resource allocation for the first and second ports for the first communication link in accordance with the comparison of the calculated first target resource allocation and the current resource allocation.

18. The system of claim 16 wherein the storage area network has at least one buffer storage, wherein the first communication link includes a fiber optic cable and wherein the resource allocation is a buffer storage credit for a unit of buffer storage of the storage area network.

19. The system of claim 15 wherein the second port is a switch port of a switch which further has a virtual control unit port having an address, and wherein the measuring a length of the first communication link comprises, issuing over the first communication link a first command directed to the virtual control unit port of the switch;

receiving over the first communication link a first response to the first command;

measuring a first time delay between the issuance of the first command and the receipt of the first response; and storing a value as a function of said first time delay as said first minimum command response time.

20. The system of claim 15 wherein the storage area network has a data path and wherein the operations further comprise:

measuring the length of a second communication link of a data path of the storage area network wherein the data path includes both the second communication link and the first communication link, wherein the measuring the length of the second communication link is a function of a second minimum command response time of a command issued over both the second communication link and the first communication link, less the first minimum command response time of a command issued over the first communication link.

21. The system of claim 15 wherein the storage management system further has a diagnostic parameter data structure, and wherein the operations further comprise storing the resource allocation at which the first and second ports for the first communication link were configured in the diagnostic parameter data structure.

* * * * *